United States Patent
Wetzer et al.

(10) Patent No.: US 7,457,762 B2
(45) Date of Patent: Nov. 25, 2008

(54) OPTIMIZATION OF MANAGEMENT OF MAINTENANCE, REPAIR AND OVERHAUL OF EQUIPMENT IN A SPECIFIED TIME WINDOW

(75) Inventors: Michael Wetzer, Redwood City, CA (US); Gary R. Garrow, Burbank, CA (US); David P. West, II, Newnan, GA (US); Patrick E. Weir, San Francisco, CA (US); Gary Ashby, Kent (GB); Charles P. Newton, III, Rock Hill, SC (US)

(73) Assignee: Accenture Global Services GmbH, Schaffhausen (CH)

( * ) Notice: Subject to any disclaimer, the term of this patent is extended or adjusted under 35 U.S.C. 154(b) by 1070 days.

(21) Appl. No.: 09/946,032

(22) Filed: Sep. 4, 2001

(65) Prior Publication Data

US 2004/0162811 A1 Aug. 19, 2004

(51) Int. Cl.
G06Q 10/00 (2006.01)
(52) U.S. Cl. ............................................... 705/8; 705/9
(58) Field of Classification Search .................... 705/8, 705/9
See application file for complete search history.

(56) References Cited

U.S. PATENT DOCUMENTS

| | | | | |
|---|---|---|---|---|
| 4,744,026 A | * | 5/1988 | Vanderbei | 705/8 |
| 4,908,775 A | | 3/1990 | Palusamy et al. | |
| 5,216,612 A | * | 6/1993 | Cornett et al. | 700/96 |
| 5,295,065 A | * | 3/1994 | Chapman et al. | 705/8 |
| 5,311,562 A | | 5/1994 | Palusamy et al. | |
| 5,331,579 A | | 7/1994 | Maguire, Jr. et al. | |
| 5,343,388 A | * | 8/1994 | Wedelin | 705/8 |
| 5,434,775 A | | 7/1995 | Sims et al. | |
| 5,596,507 A | | 1/1997 | Jones et al. | |
| 5,630,070 A | * | 5/1997 | Dietrich et al. | 705/8 |
| 5,710,723 A | | 1/1998 | Hoth et al. | |
| 5,737,728 A | * | 4/1998 | Sisley et al. | 705/8 |
| 5,754,451 A | | 5/1998 | Williams | |
| 5,778,381 A | | 7/1998 | Sandifer | |

(Continued)

FOREIGN PATENT DOCUMENTS

EP 0639815 8/1994

(Continued)

OTHER PUBLICATIONS

Swanson, Computerized maintenance management systems: a study design, Production and Inventory Management Journal, 2nd Qtr 1997, v.38, n.2, p. 11-15 (5 pages).*

(Continued)

Primary Examiner—Andre Boyce
(74) Attorney, Agent, or Firm—Brinks Hofer Gilson & Lione

(57) ABSTRACT

A method for planning, scheduling and allocation of maintenance, repair and overhaul resources includes establishing the configuration definition database, establishing a maintenance task database based on the configuration, determining the resource requirements for the maintenance tasks, optimizing the deployment of resources for those maintenance tasks in a specified time window based on resource requirements, resource availability, current maintenance execution status of equipment and activity-based cost models, creating allocation transactions to assign the resources to the specific tasks and initiating the kitting of material.

8 Claims, 1 Drawing Sheet

U.S. PATENT DOCUMENTS

| | | | |
|---|---|---|---|
| 5,826,236 A * | 10/1998 | Narimatsu et al. | 705/8 |
| 5,877,961 A | 3/1999 | Moore | |
| 5,890,133 A * | 3/1999 | Ernst | 705/8 |
| 5,897,629 A | 4/1999 | Shinagawa et al. | |
| 5,918,219 A | 6/1999 | Isherwood | |
| 5,920,846 A | 7/1999 | Storch et al. | |
| 5,931,878 A | 8/1999 | Chapin, Jr. | |
| 5,963,911 A | 10/1999 | Walker et al. | |
| 5,970,437 A | 10/1999 | Gorman et al. | |
| 5,970,466 A | 10/1999 | Detjen et al. | |
| 5,987,474 A | 11/1999 | Sandifer | |
| 5,995,915 A | 11/1999 | Reed et al. | |
| 6,006,171 A | 12/1999 | Vines et al. | |
| 6,014,633 A * | 1/2000 | DeBusk et al. | 705/8 |
| 6,038,539 A * | 3/2000 | Maruyama et al. | 705/8 |
| 6,067,486 A * | 5/2000 | Aragones et al. | 701/29 |
| 6,078,912 A * | 6/2000 | Buerger et al. | 707/1 |
| 6,101,481 A | 8/2000 | Miller | |
| 6,110,214 A | 8/2000 | Klimasauskas | |
| 6,128,543 A | 10/2000 | Hitchner | |
| 6,154,735 A | 11/2000 | Crone | |
| 6,175,934 B1 | 1/2001 | Hershey et al. | |
| 6,192,325 B1 * | 2/2001 | Piety et al. | 702/184 |
| 6,208,955 B1 | 3/2001 | Provan et al. | |
| 6,219,654 B1 | 4/2001 | Ruffin | |
| 6,230,200 B1 | 5/2001 | Forecast et al. | |
| 6,230,480 B1 | 5/2001 | Rollins, III | |
| 6,292,806 B1 | 9/2001 | Sandifer | |
| 6,308,162 B1 * | 10/2001 | Ouimet et al. | 705/8 |
| 6,321,207 B1 * | 11/2001 | Ye | 705/8 |
| 6,349,274 B1 | 2/2002 | Kay et al. | |
| 6,418,361 B2 | 7/2002 | Sinex | |
| 6,496,814 B1 | 12/2002 | Busche | |
| 6,571,158 B2 | 5/2003 | Sinex | |
| 6,580,982 B2 | 6/2003 | Sinex | |
| 6,594,786 B1 | 7/2003 | Connelly et al. | |
| 6,598,940 B2 | 7/2003 | Sinex | |
| 6,606,546 B2 | 8/2003 | Sinex | |
| 6,671,593 B2 | 12/2003 | Sinex | |
| 6,678,716 B1 | 1/2004 | Prosanti, Jr. et al. | |
| 6,684,136 B2 | 1/2004 | Sinex | |
| 6,691,006 B2 | 2/2004 | Sinex | |
| 6,691,064 B2 | 2/2004 | Vroman | |
| 6,691,244 B1 | 2/2004 | Kampe et al. | |
| 6,701,298 B1 | 3/2004 | Jutsen | |
| 6,714,829 B1 | 3/2004 | Wong | |
| 6,732,028 B2 | 5/2004 | Vanstory | |
| 6,738,748 B2 | 5/2004 | Wetzer | |
| 6,801,820 B1 | 10/2004 | Lilly et al. | |
| 6,820,038 B1 | 11/2004 | Wetzer et al. | |
| 6,980,959 B1 | 12/2005 | Garrow et al. | |
| 7,031,941 B2 | 4/2006 | Garrow et al. | |
| 7,058,587 B1 * | 6/2006 | Horne | 705/7 |
| 7,085,766 B2 | 8/2006 | Keith | |
| 7,124,059 B2 | 10/2006 | Wetzer et al. | |
| 7,231,374 B1 | 6/2007 | Balasinski | |
| 2001/0053991 A1 | 12/2001 | Bonabeu | |
| 2002/0007225 A1 | 1/2002 | Costello et al. | |
| 2002/0010615 A1 * | 1/2002 | Jacobs | 705/9 |
| 2002/0022984 A1 | 2/2002 | Daniel et al. | |
| 2002/0072988 A1 | 6/2002 | Aram | |
| 2002/0143564 A1 | 10/2002 | Webb et al. | |
| 2002/0156692 A1 | 10/2002 | Squeglia et al. | |
| 2003/0009253 A1 * | 1/2003 | McIntyre et al. | 700/108 |
| 2003/0036939 A1 | 2/2003 | Flores et al. | |
| 2003/0050824 A1 * | 3/2003 | Suemondt et al. | 705/10 |
| 2003/0216888 A1 | 11/2003 | Ridolfo | |
| 2004/0019577 A1 | 1/2004 | Abdel-Malek et al. | |
| 2005/0187838 A1 | 8/2005 | Squeglia et al. | |
| 2007/0203779 A1 * | 8/2007 | Tveit et al. | 705/9 |

FOREIGN PATENT DOCUMENTS

| | | | |
|---|---|---|---|
| EP | 1162557 A | | 12/2001 |
| JP | 60165325 | | 2/1984 |
| JP | 62026510 A | * | 2/1987 |
| JP | 02065201 | | 8/1988 |
| JP | 02127952 | | 11/1988 |
| JP | 03264250 A | * | 11/1991 |
| JP | 04025350 A | * | 1/1992 |
| JP | 07203120 | | 12/1993 |
| JP | 08180654 | | 12/1994 |
| JP | 08263546 | | 11/1996 |
| JP | 07060449 | | 2/1997 |
| JP | 9034946 | | 2/1997 |
| JP | 09050599 A | | 2/1997 |
| JP | 10298351 | | 4/1997 |
| JP | 09212555 A | | 8/1997 |
| JP | 10027200 | | 1/1998 |
| JP | 11210106 | | 1/1998 |
| JP | 2000015587 | | 6/1998 |
| JP | 2001209676 | | 1/2000 |
| JP | 2000123089 | | 4/2000 |
| JP | 2000124094 | | 4/2000 |
| JP | 2001034324 | | 2/2001 |
| JP | 2001092520 | | 4/2001 |
| WO | WO 98/44439 | | 10/1998 |
| WO | WO 01/15001 A2 | | 3/2001 |

OTHER PUBLICATIONS

Dilger, Asset management, maintenance redefined, Manufacturing Systems, Jul. 1997, v.15, n.7, p. 122-128, [online], [retrieved Sep. 8, 2005 via Dialog file 15:L01493159] (8 pages).*

Koch, Manage data to tame the maintenance tiger, Electrical World, Mar./Apr. 2001, v.215, n.2, p. 37, [online], retieved Sep. 8, 2005 via Dialog file 624:01167091 (4 pages).*

Anonymous, Maintenance mania, Manufacturing Systems, May 1998, v.16, n.5, p. 80-84, [online], [retrieved Sep. 8, 2005 via Dialog file 15:01650138] (4 pages).*

Fulcher, ERP and PDM equals productivity, Manufacturing systems, Aug. 1998, v. 1, n. 8, p. 36-40, [online], [retrieved Sep. 8, 2005 via DIALOG file 15:01690148] (5 pages).*

Al-Sultan, Maintenance control via mathematical programming, Journal of Quality in Maintenance Engineering, 1995, v.1, n.3, p. 36-46, [online], [retrieved Sep. 8, 2005 via Dialog file 15:02271208] (9 pages).*

Avery, Datastream introduces new online buy system for MRO, Purchasing, Nov. 18, 1999, v.127, n.8, p. 122 (1 page).*

Szwedo, Increasing productivity in an AS/RS maintenance department, Production and Inventory Management Journal, 1st Qtr 1995, v.36, n.1, p. 76-81 (6 pages).*

Ho, An, on-line system for aircraft maintenance, Journal of Systems Management, Sep. 1994, v.45, n.9, p. 24-27 (4 pages).*

Anonymous, Bell & Howell offers maintenance kits, Today, Feb. 2000, v.22, n.1, p. 10 (1 page).*

Cohen, Morris et al., "Optimizer: IBM's Multi-Echelon Inventory System for Managing Service Logistics", Institute of Management Sciences, Feb. 1990 [retrieved Jan. 7, 2007], pp. 65-82, retrieved from: google.com.*

McQueen, G., "Aircraft Maintenance," *Industrial Maintenance& Plant Operations*, Aug. 1996.

MIL-HDBK-61, Military Handbook, "Configuration Management Guidance," Sep. 1997.

IBM Technical Disclosure Bulletin, Computer-Aided Process Planning, v.37, n.4B, p. 605-608 [on-line], [retrieved Sep. 11, 2005 vie East] (3 pages).

Knotts, Robert M.H., Civil Aircraft Maintenance and Support; Fault Diagnosis from a Business Perspective, Journal of Quality in Maintenance Engineering, Vol. 5, No. 4, 1999, pp. 335-347. [Dialog; File 15].

Kroenke, David M. Database Processing: Fundamentals, Design and Implementation, 1999 Prentice-Hall; NJ. pp. 3-23.

International Search Report dated Oct. 4, 2002, for corresponding international application PCT/US02/09303.

Written Opinion dated Mar. 5, 2003, for corresponding international application PCT/US02/09303.

International Search Report dated Dec. 28, 2001, for corresponding international application PCT/US01/32154.

International Search Report dated Jan. 2, 2002, for corresponding international application PCT/US01/32576.

Parker A. Grant and James F. Mazeski; "Turbine Engine Maintenance-Back to Basics", Aircraft Maintenance Technology, Nov. 2000, retrieved from the web at: http://amtonline.com/publication/article.jsp?publd=1&id=1035.

Manny Gdalevitch, "MSG-3, The Intelligent Maintenance", Nov. 2000, Aircraft Maintenance Technology, pp. 1-6, retrieved from the web at: http://amtonline.com/publication/article.jsp?publd=1&id=1039.

Harry Fenton, "Magnetos Under PressureMagnetos Under Pressure", Jul. 2000, retrieved from the web at: http://amtonline.com/publication/article.jsp?publd=1&id=992.

Jack Hessburg, "Scheduled Maintenance Tasks: Working through the development process with the Maintenance Steering Group", Mar. 2000, retrieved from the web at: http://amtonline.com/publication/article.jsp?publd=1&id=950.

Bill de Decker, "Save on Maintenance Costs", Mar. 2000, retrieved from the web at: http://amtonline.com/publication/article.jsp?pubid=1&id=952.

Michael M. DiMauro, "Preventive Maintenance for Thrust Reversers", Mar. 2000, retrieved from the web at: http://amtonline.com/publication/article.jsp?pubid=1&id=947.

Airman 2000: simplifying and optimizing aircraft maintenance, pp. 1-3, retrieved from the web at: http://www.content.airbusworld.convsites/Customerservices/html/acrobattfast 29_pO2_07_airman. pdf, Dec. 2000.

Vijayan, Jaikumar, "Fault-Tolerant Computing", Computerworld vol. 34, 1 pages Issue 47, Mar./Apr. 2000.

The prosecution history of U.S. Appl. No. 09/825,633 shown in the attached Patent Application Retrieval file wrapper document list, printed Mar. 7, 2008, including each substantive office action and applicant response.

The prosecution history of U.S. Appl. No. 09/960,793 shown in the attached Patent Application Retrieval file wrapper document list, printed Mar. 7, 2008, including each substantive office action and applicant response.

The prosecution history of U.S. Appl. No. 09/947,136 shown in the attached Patent Application Retrieval file wrapper document list, printed Mar. 7, 2008, including each substantive office action and applicant response.

The prosecution history of U.S. Appl. No. 09/947,024 shown in the attached Patent Application Retrieval file wrapper document list, printed Mar. 7, 2008, including each substantive office action and applicant response.

The prosecution history of U.S. Appl. No. 09/946,894 shown in the attached Patent Application Retrieval file wrapper document list, printed Mar. 7, 2008, including each substantive office action and applicant response.

The prosecution history of U.S. Appl. No. 09/946,093 shown in the attached Patent Application Retrieval file wrapper document list, printed Mar. 7, 2008, including each substantive office action and applicant response.

The prosecution history of U.S. Appl. No. 09/946,095 shown in the attached Patent Application Retrieval file wrapper document list, printed Mar. 7, 2008, including each substantive office action and applicant response.

The prosecution history of U.S. Appl. No. 09/946,160 shown in the attached Patent Application Retrieval file wrapper document list, printed Mar. 7, 2008, including each substantive office action and applicant response.

The prosecution history of U.S. Appl. No. 10/799,914 shown in the attached Patent Application Retrieval file wrapper document list, printed Mar. 7, 2008, including each substantive office action and applicant response.

The prosecution history of U.S. Appl. No. 09/947,157 shown in the attached Patent Application Retrieval file wrapper document list, printed Apr. 2, 2008, including each substantive office action and applicant response.

The prosecution history of U.S. Appl. No. 09/690,793 shown in the attached Patent Application Retrieval file wrapper document list, printed Mar. 7, 2008, including each substantive office action and applicant response.

* cited by examiner ical equipment are typically so far "off base" with the reality of the tasks.

OPTIMIZATION OF MANAGEMENT OF MAINTENANCE, REPAIR AND OVERHAUL OF EQUIPMENT IN A SPECIFIED TIME WINDOW

BACKGROUND OF THE INVENTION

This invention relates to a method for managing maintenance of equipment. More particularly, this invention relates to a method for managing maintenance of equipment by a maintenance, repair and overhaul (MRO) business organization.

Historically, within MRO business organizations, resource planning has been performed as a product of resource availability within a very near term time window, usually within weeks. The specific scheduling activity of maintenance tasks usually is the product of responding to emergencies and matters of necessities to keep a particular end item, or a piece of equipment, in service. The result is that maintenance schedules often serve as general guidelines with critical resources being poorly allocated. Those resources typically need to be continually swapped and reallocated in an ad hoc manner to meet the emergency maintenance needs. This informality often results in both excessive equipment down times and excessive cost of maintenance.

Accomplishment of maintenance plans can often be measured in multiples of originally forecast expenditures, both in time and money. Much of this lost efficiency is the product of inadequate communication of facts as they are known or become known, inadequate strength of predicted work analysis and attempts to adhere to non-applicable schedules and allocation profiles.

Compounding the planning scheduling and allocation problem is the reality that knowledge about the piece of equipment that is going to be maintained is often rudimentary and presumptive as opposed to being clearly defined. The impact that discovery of actual equipment configurations or mismatched configurations has on planning, scheduling and allocation processes is impressive. In highly technical end item maintenance, these mismatches coupled with the additive tasks, also known as "emergent" work, which emerge as "over and above" work to be formed, can account for between 50 and 80 percent of the total maintenance tasks performed. This provides a solid indication of the reason that planning, scheduling and allocation processes that occur before the start of the maintenance execution activities are typically so far "off base" with the reality of the tasks.

Additionally, MRO difficulties result when the specific nature of the scheduling problem is not well understood and schedules are developed on a one-size fits all basis. Using aircraft maintenance as an illustration, the scheduling needs for line maintenance differ dramatically from hangar maintenance. Neither one relates well to back shop schedule requirements. But all three of line, hangar and back shop maintenance must be harmonized and balanced to achieve the total end goal for an airline, which is 100 percent safe and compliant aircraft, on-time, and at an appropriate cost. If the required maintenance methodologies for the different locations are not recognized or accommodated, the resulting maintenance schedule may not be useful or applicable.

Accordingly, there is a need in a MRO business organization for the planning, scheduling and allocation of the required resources needed for the maintenance to be performed in a robust and integrated fashion with the ability to replan, reschedule, and reallocate those resources based on an exceptionally dynamic set of requirements which come from within the control of the MRO business as well as external sources.

BRIEF SUMMARY OF THE INVENTION

This invention provides a solution to the aforementioned needs by providing a method for managing the maintenance, repair or overhaul of equipment and for planning, scheduling and allocating the resources required for the maintenance tasks. In one embodiment, the method includes establishing a configuration definition database comprising data representing a definition of a configuration of an end item of equipment requiring maintenance, establishing a maintenance task database comprising a description of maintenance tasks to be performed within a specified time window for the end item based on the configuration, determining the resource requirements for each maintenance task, determining the expected resources available for the specified time window, obtaining a maintenance execution status of end items currently undergoing maintenance, obtaining activity-based cost models for the resources, developing a preliminary resource plan for the maintenance task to be performed within the specified time window based on the resource requirements, resource availability and costs, and optimizing the preliminary resource plan.

In a second embodiment of the invention, the method includes optimizing the deployment of resources for the maintenance, repair or overhaul of an end item of equipment requiring maintenance in a specified time window, creating allocation transactions to assign the resources to the specific maintenance task to be performed on the end item in the specific time window, initiating the kitting of material required for the maintenance task and ordering delivery of the material to a work location or to a technician who is assigned to perform the maintenance.

Other features and advantages of the invention will become apparent based on the following detailed description of the invention and associated figures.

DETAILED DESCRIPTION OF PREFERRED EMBODIMENTS

Figure 1:
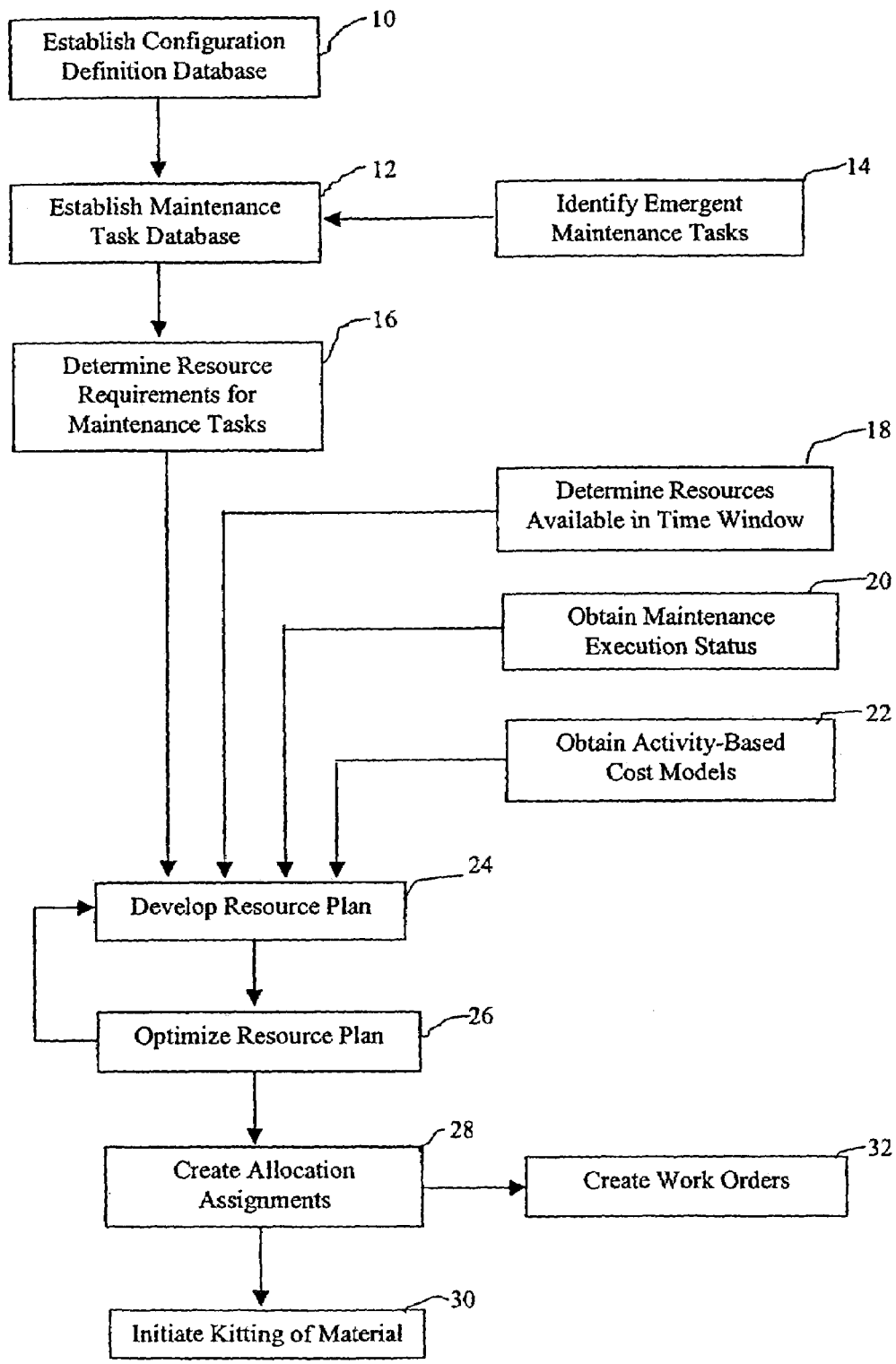
FIG. 1 represents a flowchart of a preferred method for managing maintenance of equipment in accordance with the invention.

Maintenance, repair and overhaul (MRO) activities may be considered distinct, but possibly overlapping activities. Nevertheless, when referred to generally and unless noted otherwise, use of the phrase "maintenance task" or "maintenance activity" refers at least one of maintenance, repair and overhaul of an item of equipment or a component of the item. A "component" generally unless noted otherwise means a component, a sub-component, an assembly, a system, or any other part of an item of equipment. A component may include, but need not include, one or more sub-components. An assembly may comprise a group of components that are integrated together. Material refers to raw material, a consumable, a provision, or other equipment-related resources related to the performance of a maintenance activity.

Mechanical equipment refers to a machine or machinery that is formed of a defined arrangement of multiple components. A component may represent a part, an assembly of parts, a subassembly of a part, an element, or another constituent of a machine. A component is not limited to mechanical elements and is broadly defined to include an electrical assembly, an electrical system, an electronic system, a computer controller, software, or the like. Mechanical equipment includes heavy equipment and capital-intensive equipment that is movable or fixed. Mobile mechanical equipment includes airplanes, busses, locomotives, ships, cranes, heavy trucks, earth-moving equipment, or the like. Fixed mechanical equipment includes electrical power generators, industrial presses, manufacturing equipment, or the like.

A configuration defines the identity of the components (e.g., parts), a specification of the components, and the relationship among the arrangement of components of the mechanical equipment, among other things. Because some components are interchangeable with substitutes, the configuration of mechanical equipment may vary throughout a life span of the mechanical equipment as equipment-related work (e.g., maintenance, repair, or overhaul (MRO) work) is performed. The configuration of mechanical equipment may change because of a revision of product definitions or a review (e.g., a financial and performance review) of the mechanical equipment. Further, even during the manufacturing process, the manufacturer of the mechanical equipment may substitute different components (e.g., parts) from different suppliers to customize the mechanical equipment, to meet a certain technical specifications for the mechanical equipment, or to save manufacturing costs on the mechanical equipment. For example, the manufacturer may change technical specifications of mechanical equipment to rectify manufacturing anomalies or to facilitate more reliable production. Therefore, configuration definitions are an important aspect of maintenance planning.

The invention is applicable to all industries having MRO businesses, either as separate enterprises or business operations within a larger company. The descriptions and examples herein are focused on aircraft as the "most difficult" example of MRO. The use of the aircraft metaphor translates directly to all forms of complex product/mechanism MRO (ships; trains; oil platforms; nuclear power plants; etc) with the major changes being nomenclature for the end product being maintained, and the degree (and forms) of regulatory agencies involved with industries that utilize these various products/mechanisms. The problems and solutions do not appreciably change from industry to industry, only the percent of focus of the MRO activity that is unplanned. For example, electrical power plants may have only 30% of their total MRO work as "unplanned," while oil platforms may have 80% of their total MRO work as "unplanned."

In accordance with the invention, FIG. 1 shows a flowchart of a method for managing the maintenance of equipment. More particularly, this is a method to plan, schedule and allocate the resources used and necessary for maintenance of the equipment. Although the method is depicted as having a particular sequence of steps, the exact order of steps as shown is not necessary to practice this invention.

In a brief overview, this process includes establishing a configuration definition database 10; establishing a maintenance task database 12 of tasks to be performed within a specified time window for the end item based on the configuration; determining the resource requirements for each maintenance task; identifying emergent maintenance tasks 14 to be performed in a specific time window and incorporating those tasks into the maintenance task database; determining the resource requirements for each maintenance task 16; determining the expected resources available 18 for the specified time window; obtaining a maintenance execution status 20; obtaining activity-based cost models 22 for said resources; developing a preliminary resource plan 24 for the maintenance tasks to be performed within said specified time window based on the resource requirements, resource availability, and costs; optimizing the preliminary resource plan 26; creating allocation transactions 28 to assign the resources to the specific end item for the specific maintenance task; initiating kitting of material 30 required for the maintenance task; and generating work orders 32 for performing the maintenance. The steps of the process may be carried out in any sequence, and are not limited to the specific sequence or workflow depicted or described herein.

To further illustrate the invention, the preferred embodiment depicted in FIG. 1 is explained in greater detail below.

Step 10 involves establishing a configuration definition database of the mechanical equipment. The term establishing, as used herein, is not limited to creating the database, which may already exist, but is intended in its broadest scope to also include identifying the database and/or establishing a communication link with the database, and/or communicating with the database. The database comprises data representing a definition of the configuration of one or more end items of equipment requiring maintenance. The use of the term end item refers to the overall piece of equipment. For example, in the aircraft industry the end item is the airplane. The configuration definition data comprises equipment identifiers (e.g., tail number of an airplane) that identifies the entire mechanical equipment, a part identifier that identifies a part of the mechanical equipment, an assembly identifier that identifies an assembly of parts of the equipment, a component identifier that identifies a component within an assembly of the equipment, specification description that describes the specification of a part or component or assembly, and a relationship description that describes the relationship of a part or component to the mechanical equipment or subassembly thereof. For example, the relationship description may include the mounting position of a part and mechanical equipment. The data may also include operating restrictions on the mechanical equipment because of the presence of a particular part or arrangement of particular parts on the mechanical equipment.

Configuration data on a particular end item of equipment may only remain valid for a limited duration. Upon or before expiration of that duration, the configuration is preferably updated. If the contents of the databases are updated with sufficient frequency to avoid outdated configuration data, the update procedure may generally be sought of as occurring as a real-time procedure. The real-time procedure seeks to minimize inaccuracy of the configuration data by reflecting changes to the actual configuration of the mechanical equipment as the changes occur with a minimal lag time.

Preferably, the configuration definition database includes a robust definition of a configuration of each item. This configuration may include definitions from multiple perspectives, such as functional, logical, physical, or operation configurations. The functional configuration refers to the specifications of the equipment from a functional perspective. The logical configuration refers to the ideal configuration whereas the physical configuration refers to the actual condition of the equipment. The operational configuration refers to the operating performance of the equipment. As may be understood, there may be gaps between the physical or actual configuration and the logical or desired configuration. As well there may be gaps between the operational configuration and the logical configuration. These gaps may be drivers for the upgrade requirements of the equipment. These gaps may also be due to the degradation of the equipment. The definitions of these configurations are integrated to allow the traceability between and among the different types of configurations of the specific end item or control component in the end item. The summary analysis of these configurations establishes the "expected" maintenance configuration for each end item, component or sub-element analyzed.

The next step 12 includes establishing a maintenance task database comprising a description of maintenance task to be performed within a specified time window for the end item based on the configuration. This database includes a full and complete definition of the maintenance tasks and processes that are required to be performed within the specified time windows. This includes the maintenance tasks for the components and system sub-elements as well. This database is inclusive of the recommended maintenance tasks for each end item as well as any additional work predicted as a work requirement, no matter what the manner or timing of the prediction. This maintenance task database depends on the configuration definition database as a driver for recommended tasks for upgrading the actual physical configuration to the desired or logical configuration for example. In addition, the full and complete definition of these tasks are also dependent on the actual configuration of the equipment. Knowing what version or revision of equipment and software and components in the end item will determine the specifics of the tasks and procedures that are to be implemented.

The next step 14 preferably incorporates emergent work into the maintenance task database at the appropriate time window within which it is to be performed. During the course of any maintenance activity, many other components or sub-elements in need of repair may be identified by maintenance technicians. These emergent "above and beyond" unplanned maintenance tasks are preferably sequenced into the planned maintenance tasks. Applicant's commonly owned, co-pending application entitled, Identification, Categorization and Integration of Unplanned Maintenance, Repair and Overhaul Work on Mechanical Equipment, Application Ser. No. 09/946,095, filed on the same date herewith by the same inventors, which is incorporated herein by reference, includes details as to how those emergent tasks are sequenced with other tasks. Accordingly, after identification and sequencing of the emergent maintenance tasks 14, these tasks are transmitted to the maintenance task database to update the maintenance task to be performed. In one sense, the emergent tasks then become planned tasks.

The next step 16 is determining the resource requirements for each maintenance task in the maintenance task database. These resource requirements include at least one of labor, materials, tools, facilities, end item location, task precedence with respect to other tasks, and time span for the task. These resource requirements may be defined by the component manufacturers or determined by past practice, or determined by other known means. The labor requirements include not only the hours of labor required but as well the skill specialty required and any necessary certification of the technician required to perform the maintenance task. Tools and facilities may be considered to be parts of the infrastructure resources, which also may comprise one or more of the following: facilities, parts of facilities, tools, test fixtures, test devices, diagnostic equipment, test equipment, and computer-based support systems.

Materials or equipment-related resources comprise one or more of the following: components, sub-components, an assembly, and a system. The materials or components required include those materials, which must be maintained in place or return to the specific end item after restoration, including established rotables. Rotables are components that can be repaired or rejuvenated on a control and scheduled basis rather than having to go forward and purchase new units. These are typically components that have a fairly high value and require a lengthy period of time to repair. Items such as pumps, actuators, avionics black boxes fall within this category. These rotables represent significant dollars to the business and the way they are usually managed is by having "pools of rotables" (e.g. five pumps) which serve as a schedule buffer for those which are removed from the end item. The pool size is determined by how quickly the rotable can be "rotated" through the rebuild cycle. For example, if the typical experience is that one pump fails per day and there is a 5-day turnaround on a rebuild of the pump, then the rotable pool has to have five pumps at a minimum to cover the rebuild time span.

Additional resource requirements include tooling and/or test processes and equipment required for each task as needed. The specific facilities that are required is an important resource because certain maintenance tasks require special handling or support fixtures some of these items may be portable but others may be limited to fixed maintenance facilities. As well, other facilities and concerns such as safety requirements and special certifications are included here. The location of the end item can also be considered to be a resource requirement because it well occupy a certain physical location such maintenance area number 1, or hangar number 2, etc. that would prevent other end items from using the same location during that maintenance time period.

The time span required for each maintenance task is also important. The time span may be long or short and require special tests and safety check that may go beyond the actual time required for the maintenance itself. As well, this may have an impact on shift changes and other labor issues. In addition, this will also relate to the task precedence with respect to other tasks and this includes the relationship between waiting for the completion of one task before being able to start a second task or whether the tasks may be completed concurrently. This also may relate to the sequence in which tasks are performed, i.e. having to fix item A first since item A is physically located beneath item B, which can then be repaired afterwards.

The next step 18 includes determining the resources available for a specified time window. These resources include the individual technicians that are available with definition of their skills sets, certification, crew assignments, and/or other allocations of those technicians. Another resource includes a component or raw material supply profiles, which include which material is in stock or on order or in transit as well as existing allocations of those components or raw materials. The material availability also includes the knowledge of whether those allocations are for planning purposes only, i.e. for soft allocations or virtual kitting, or are true item designations, i.e. hard allocation physical kits that are pre-staged or staged for a specific end use that cannot be disrupted. Material and availability includes information as to the contracted procurement lead-time for each item so that one can know when new or more items will become available. Another resource relates to the tool and testing equipment inventory, the location of all those tools and the schedule availability for each of those tools. Another resource availability includes the facility utilization and/or assignment profiles. Likewise, another resource is the end item availability. The maintenance activity must be planned around and in sequence with operational use of the equipment. Thus, the availability of the end item during a specific time window is a planning constraint that must be balanced between the operational demands the assets and the need for the maintenance activity.

The next step 20 is obtaining maintenance execution status. This step includes identifying the status of the end items currently undergoing maintenance. It is important to know the availability of the end item for carrying out the maintenance and when such maintenance will be completed, or even whether or not those tasks are being completed or must be rescheduled for a later time. Preferably, this includes task completion forecast for the specified time windows. More preferably, the status is updated in real time so that, as soon as tasks are completed or forecasted to be completed, that information and knowledge is updated and available to the system to read. If not immediately then within reasonable time period such as 15 minutes, or one-half hour or as soon as may be reasonably conducted.

The next step 22 includes obtaining activity based cost models for the resources. These cost models include expected cost of various processes and sub-processes and organizational units within a maintenance, repair and overhaul (MRO) business organization. These cost models include personnel cost, employment cost, raw material cost, cost of consumable items, and any special facility costs.

The next step 24 includes developing a preliminary resource plan for the maintenance task to be performed within a specified time window. This resource plan is based on the resource requirements determined at step 14, resource availability determined at step 18, the maintenance execution status determined at step 20, and the cost models obtained in step 22. Resource planning tools takes all of these constraints and applies algorithms and modeling and forecast analysis to develop an preliminary resource plan. The resource plan may also be constrained by other rule sets imposed by the specific MRO business that are unique to their own operations. Those organizations may have specific rules with regard to skill levels of technicians that may perform certain tasks. Other rules may deal with the cost of making changes, other rules may relate to the time availability. For example of airlines, some airlines keep their aircraft constantly in flight operations with very short gate time that limits the maintenance task that can be performed during the passenger turn around. On the other hand other airlines may have aircraft scheduled to sit at the gate for a longer period of time. Other airlines may have other requirements such as, on the one hand, minimizing the actual part replacements in preferring items to be maintained in place where possible, while on the other hand some other airlines may prefer to have lower cost items considered to be rotables or swapped out for quick repair of the end item while the swapped out component is repaired off site at a later time.

After the preliminary resource plan is developed, the next step 26 is to optimize that resource plan. This optimization may be a reiterative process with the resource planning tools. The optimization may account more for costing models and may come up with alternatives that require human intervention to select specific options that are desired, which will then cause the optimizer to reiterate back to the resource planning tools to re-execute the schedules. The optimization tools utilized may include well-known and commercially available optimizers based on finite-capacity analysis, open-ended capacity projections, "what if" models for various solution sets, probability-based projections for both historical and engineered data, simulations, and optimized activity-based cost models.

Numerous software tools are commercially available that may be suitable for this invention. For example, software tools are available from Manugistics, Inc., located Rockville, Md., which focuses on software solutions for enterprise profit optimization. In particular, Manugistics has software tools directed to supplier relationship management and supply chain management. Such software tools are useful for Capacity Planning, Scheduling and Resource Optimization, including personnel, facilities and tools, and for Material/Components Optimization.

Naturally, the optimizers will be customized for a specific company's preferences, and may allow human intervention to develop an optimized plan. For example, one such opportunity for selecting an option of between different plans may involve the task precedence requirements. If a first task requires the completion of a second task before performing the first task, the system may identify several time windows within which the second task has already been planned. The system may evaluate relative cost of performing the first task either in the present time window or in a second time window or in later time windows when the second task is planned. The system may then provide the user with the option to select which time window during which to perform the first task. Likewise based on some rule sets in the system, the system may determine whether it is preferred to complete both tasks in an earlier time window or in a later time window.

After optimizing the resource plan, the next step 28 is to create allocation transactions or assignments. The allocation transactions are created to assign the resources to the specific end item for the specific maintenance task during the specific time window. The allocation transaction may also drive other steps such as step 30 of initiating the kitting of materials. The transaction that orders the initiation of the kitting would also specify whether this kitting is to be virtual, i.e. a soft allocation of the resources on the computer or whether the kitting is to be actual, i.e. the items are physically pooled and placed together in the same bin. The allocation transaction may also initiate the delivery of the materials to the location or the technician where the maintenance task is to be performed. Preferably the allocation transaction also initiates another step 32 for generating work orders. The work orders preferably include detailed instructions to a maintenance technician of a maintenance task to be performed, when it is to be performed, and all the resources that have been allocated to complete the task.

One advantage of this invention is to remove the variability of the work to be done in a highly variable environment. By creating a dynamic model that can account for newly identified emergent maintenance tasks as well as recommended planned maintenance tasks and predicted maintenance tasks, the system can have a complete picture of all the resources required for those tasks, the resources that are available to perform those tasks, the cost for those tasks as well as all of the constraint and other rules imposed by the business organization and then develop a plan and optimize that plan dynamically and on a regular basis to reduce the number of unknown and mismatched work therefore by putting the effort into planning upfront knowing what the precise configuration of the end item is. Much of the on-the-fly guesswork of traditional MRO business organizations can be replaced with optimized efficient planning, scheduling and resource allocations.

While this invention has been shown and described in connection with a preferred embodiment, it is apparent that certain changes and modifications in addition to those mentioned above may be made from the basic features of this invention. In addition, there may be many different types of computer software and hardware that may be utilized for practicing the invention, and the invention is not limited to the examples described above. Accordingly, the described embodiments are to be considered in all respects only as illustrative and not restrictive, and the scope of the invention is therefore indicated by the appended claims rather than the foregoing description. All changes that come within the scope and range of the equivalency of the claims are to be embraced within their scope.

We claim:

1. A method for managing maintenance, repair or overhaul of equipment, the method comprising:
   retrieving a desired configuration for the equipment from a configuration definition database;
   retrieving an actual configuration for the equipment from the configuration definition database;
   identifying a configuration gap for the equipment based on the actual configuration and the desired configuration;
   identifying an upgrade requirement driven by the configuration gap;
   identifying a planned maintenance requirement for the equipment;
   receiving an identification of an unplanned maintenance requirement for the equipment;
   determining availability of the equipment for performing a maintenance task, the maintenance task including the upgrade requirement, the planned maintenance requirement, and the unplanned maintenance requirement, the equipment requiring maintenance in a specified time window, determining the availability of the equipment including:
      forecasting task completion on the equipment; and
      updating a status of the task completion in real time;
   performing resource planning for performing the maintenance task in the specified time window based on resource requirements, the availability of the equipment including the status of the task completion, and cost models,
   wherein the resource requirements comprise labor, materials, tools, facilities, end item location, and time span for the maintenance task; and
   wherein the cost models comprise personnel cost, employment cost, raw material cost, cost of consumable items and facility costs;
   constraining the resource planning by a set of rules imposed by a specific business in a selected industry and being unique to operations of the specific business, wherein the set of rules differs for the specific business from other sets of rules for other business in the selected industry;
   optimizing with a software tool a deployment of resources for the maintenance task for the equipment;
   creating allocation transactions to assign a first material and a second material to the maintenance task to be performed on the equipment in the specified time window, including:
      determining whether an existing prior allocation includes a true item designation that indicates a hard allocation of the first material and the second material;
      soft allocating the second material into a virtual kit in a data processing system;
      soft allocating the first material into the virtual kit in the data processing system; and
      removing the first material from the virtual kit when the existing prior allocation includes the true item designation, which indicates that the first material must remain with the existing prior allocation and should be removed from the virtual kit; and
   hard allocating the second material into a physical kit that is staged for the maintenance task that cannot be disrupted when the existing prior allocation does not include the true item designation, which indicates that the second material may be freely allocated, and wherein hard allocating the second material prevents the second material from being removed from the virtual kit.

2. The method of claim 1, further comprising generating a work order describing the maintenance task and the resources allocated for the maintenance task.

3. The method of claim 1, further comprising identifying newly discovered maintenance tasks required to be performed within the specified time window, determining additional resources required for the newly discovered maintenance tasks, updating the optimization of the deployment of resources incorporating the additional resources required, and creating additional allocation transactions to assign the additional resources to the maintenance task.

4. The method of claim 1, where soft allocating the second material further comprises soft allocating a new material which will be available based on a contracted procurement lead-time.

5. The method of claim 1, wherein the optimizing further comprises analyzing a repair cycle time of a rotable component organized into a rotable pool, with a pre-selected pool size, of multiple instances of the rotable component.

6. A resource allocation method comprising:
   retrieving a desired configuration for equipment from a configuration definition database;
   retrieving an actual configuration for the equipment from the configuration definition database
   identifying a configuration gap for the equipment based on the actual configuration and the desired configuration;
   identifying a degradation associated with the configuration gap;
   identifying a maintenance task for the equipment for addressing the degradation;
   identifying an unplanned maintenance task for the equipment for addressing the degradation;
   determining a first resource and a second resource for the maintenance task which are available during the maintenance time window;
   determining availability of the equipment for performing a maintenance task, the maintenance task including the upgrade requirement, the planned maintenance requirement, and the unplanned maintenance requirement, the equipment requiring maintenance in the maintenance time window, determining the availability of the equipment including:
      forecasting task completion on the equipment; and
      updating a status of the task completion in real time;
   obtaining an activity based cost model for the first and second resources wherein the cost models comprise personnel cost, employment cost, raw material cost, cost of consumable items and facility costs;
   performing resource planning for performing the maintenance task in the maintenance time window based on resource requirements, the availability of the equipment including the status of the task completion, and the activity based cost model;
   wherein the resource requirements comprise labor, materials, tools, facilities, end item location, and time span for the maintenance task; and
   constraining the resource planning by a set of rules imposed by a specific business in a selected industry and being unique to operations of the specific business, wherein the set of rules differs for the specific business from other sets of rules for other businesses in the selected industry;
   optimizing, with a software tool in a data processing system, deployment of the first and second resources;

determining whether an existing prior allocation includes a true item designation that indicates a hard allocation of the first resource and the second resource;

creating a first soft allocation transaction to assign the second resource to the maintenance task for the equipment item;

creating a virtual kit in a data processing system in response to creating the first soft allocation;

creating a second soft allocation transaction to assign the first resource into the virtual kit in the data processing system;

removing the first resource from the virtual kit when the existing prior allocation includes the true item designation, which indicates that the first resource must remain with the existing prior allocation and should be removed from the virtual kit; and creating a hard allocation transaction to assign the second resource to the maintenance task that cannot be disrupted when the existing prior allocation does not include the true item designation, which indicates that the second resource may be freely allocated, and wherein hard allocating the second resource prevents the second resource from being removed from the virtual kit; and creating a physical kit comprising the second resource in response to creating the hard allocation.

7. The method of claim 6, further comprising:

pooling a rotable component into a rotable pool for the second resource.

8. The method of claim 7, further comprising:

determining a preselected pool size for the rotable pool based on a repair cycle time of the rotable component.

\* \* \* \* \*

UNITED STATES PATENT AND TRADEMARK OFFICE
CERTIFICATE OF CORRECTION

| | | |
|---|---|---|
| PATENT NO. | : 7,457,762 B2 | Page 1 of 1 |
| APPLICATION NO. | : 09/946032 | |
| DATED | : November 25, 2008 | |
| INVENTOR(S) | : Wetzer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1739 days.

Signed and Sealed this
Fifteenth Day of May, 2012

David J. Kappos
*Director of the United States Patent and Trademark Office*